United States Patent
Lin

(10) Patent No.: US 9,602,014 B2
(45) Date of Patent: Mar. 21, 2017

(54) VOLTAGE CONVERTER CIRCUIT AND VOLTAGE CONVERTER CONTROLLER AND PARAMETER SETTING METHOD THEREFOR

(71) Applicant: Kun-Yu Lin, Zhubei (TW)

(72) Inventor: Kun-Yu Lin, Zhubei (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 89 days.

(21) Appl. No.: 14/511,508

(22) Filed: Oct. 10, 2014

(65) Prior Publication Data

US 2015/0023071 A1  Jan. 22, 2015

Related U.S. Application Data

(63) Continuation-in-part of application No. 13/869,684, filed on Apr. 24, 2013, now abandoned.

(30) Foreign Application Priority Data

Feb. 10, 2014  (TW) .............................. 103104199 A

(51) Int. Cl.
| | | |
|---|---|---|
| *G05F 1/00* | (2006.01) | |
| *H02M 3/335* | (2006.01) | |
| *H02M 3/158* | (2006.01) | |
| *H02M 1/00* | (2006.01) | |
| *H02M 1/36* | (2007.01) | |

(52) U.S. Cl.
CPC .......... *H02M 3/33523* (2013.01); *H02M 1/36* (2013.01); *H02M 3/158* (2013.01); *H02M 2001/0009* (2013.01)

(58) Field of Classification Search
CPC .......... H02M 2001/0045; H02M 1/08; H02M 1/096; H02M 7/125; H02M 7/538466; G05F 1/461; G05F 1/565
USPC ................ 323/266, 271, 274–277, 284, 288; 363/21.05, 21.07–21.11, 21.16–21.18
See application file for complete search history.

(56) References Cited

U.S. PATENT DOCUMENTS

| | | | | |
|---|---|---|---|---|
| 7,098,632 B2* | 8/2006 | Chen | .................... | H02H 7/1213 323/222 |
| 7,233,131 B2* | 6/2007 | Lin | ........................ | H02M 3/156 323/268 |
| 7,292,019 B1* | 11/2007 | Fernald | ................. | H02M 3/157 323/297 |
| 7,315,190 B1 | 1/2008 | Chen | | |
| 7,790,327 B2* | 9/2010 | Ham | .................... | H01M 8/142 429/475 |

(Continued)

*Primary Examiner* — Adolf Berhane
*Assistant Examiner* — Gary Nash
(74) *Attorney, Agent, or Firm* — Tung & Associates

(57) ABSTRACT

A voltage converter circuit includes a voltage converter controller which generates a PWM signal to operate a power switch for voltage conversion. The voltage converter controller includes a sensing pin for sensing a current and the voltage converter controller receives a power supply. A parameter setting method for the voltage converter circuit includes: during a start-up stage, when the power supply increases above a predetermined reference level, the voltage converter controller outputting a current through the sensing pin; and setting at least one parameter of the voltage converter controller according to a voltage at the sensing pin.

21 Claims, 9 Drawing Sheets

(56) References Cited

U.S. PATENT DOCUMENTS

| | | | |
|---|---|---|---|
| 7,791,327 B2* | 9/2010 | Liu | H02M 3/1588 |
| | | | 323/284 |
| 7,936,140 B2* | 5/2011 | Wei | H02P 7/295 |
| | | | 173/176 |
| 8,120,931 B2* | 2/2012 | Chang | H02M 1/32 |
| | | | 363/21.07 |
| 8,416,596 B2* | 4/2013 | Huang | H02M 3/33507 |
| | | | 363/21.11 |
| 8,891,258 B2* | 11/2014 | Zhang | H02M 3/33507 |
| | | | 363/21.12 |
| 2005/0258808 A1 | 11/2005 | Chen et al. | |
| 2008/0259655 A1* | 10/2008 | Wei | H02M 3/335 |
| | | | 363/21.18 |
| 2010/0124084 A1 | 5/2010 | Chang et al. | |
| 2011/0255312 A1* | 10/2011 | Lin | H02M 3/33523 |
| | | | 363/21.16 |
| 2013/0070379 A1* | 3/2013 | Pan | H02H 3/006 |
| | | | 361/87 |

* cited by examiner

VOLTAGE CONVERTER CIRCUIT AND VOLTAGE CONVERTER CONTROLLER AND PARAMETER SETTING METHOD THEREFOR

CROSS REFERENCE

The present invention is a continuation-in-part application of U.S. Ser. No. 13/869,684 filed on Apr. 24, 2013. The present invention also claims priority to TW 103104199, filed on Feb. 10, 2014.

BACKGROUND OF THE INVENTION

Field of the Invention

This invention relates to a voltage converter circuit and a voltage converter controller, especially to a voltage converter circuit and a voltage converter controller which includes an integrated circuit and capable of setting a parameter thereof without extra pins.

Description of Related Art

U.S. Pat. No. 7,315,190 discloses a voltage converter controller 200. This voltage converter controller 200 was implemented by an integrated circuit capable of reducing geometric size and cost. In order to set circuit parameters of the voltage converter controller 200, a discrete resistor Roc is connected to an output pin P4 of a power switch driver stage, and a default current source of the voltage converter controller 200 provides a current flowing through the resistor Roc to generate a voltage when the voltage converter controller 200 is in a start-up stage and does not enter a normal operating state yet. Then the voltage is sampled and held to set the circuit parameters of the voltage converter controller 200. Thus an extra pin is not required for the voltage converter controller 200 to setup the circuit parameters. Furthermore, the resistance of the resistor Roc can be adjusted to change the circuit parameters.

This prior art U.S. Pat. No. 7,315,190 can only set the circuit parameters during the start-up stage before the circuit enters normal operation, but can not set the circuit parameters during normal operation.

SUMMARY OF THE INVENTION

In view of above drawback, this invention provides a voltage converter circuit and a voltage converter controller including an integrated circuit and capable of setting a parameter thereof without extra pins. The present invention can set the circuit parameters during the start-up stage before the circuit enters normal operation, and the present invention also can set the circuit parameters during normal operation. Therefore, a user can set the circuit parameters at any desired timings, either during the start-up stage or during normal operation, or both.

In one embodiment, a voltage converter controller is adapted to a voltage converter circuit which generates a pulse-width-modulation (PWM) signal to operate a power switch thereof so as to drive a current load. The PWM signal toggles between a first level and a second level. The voltage converter controller includes a sensing pin and a parameter sampling and setting unit. The sensing pin receives a first sensing signal when the PWM signal is at the first level, and the sensing pin receives a second sensing signal when the PWM signal is at the second level. The parameter sampling and setting unit has an input terminal coupling to the sensing pin. When the PWM signal is at the second level, the parameter sampling and setting unit generates a default current or a default voltage on the sensing pin to generate the second sensing signal and simultaneously samples the second sensing signal to generate a sampling signal. And when the PWM signal is at the first level, the parameter sampling and setting unit holds the sampling signal to set a parameter of the voltage converter controller.

In another embodiment, a voltage converter circuit includes a power switch, a sensing pin, and a parameter sampling and setting unit. A power switch is controlled by a PWM signal to drive a current load. The PWM signal toggles between a first level and a second level. The sensing pin receives a first sensing signal when the PWM signal is at the first level, and the sensing pin receives a second sensing signal when the PWM signal is at the second level. The parameter sampling and setting unit has an input terminal coupling to the sensing pin. When the PWM signal is at the second level, the parameter sampling and setting unit simultaneously generates a default current or a default voltage on the sensing pin to generate the second sensing signal and samples the second sensing signal to generate a sampling signal. And when the PWM signal is at the first level, the parameter sampling and setting unit holds the sampling signal to set a parameter of the voltage converter circuit.

In another aspect, the present invention provides a parameter setting method for a voltage converter circuit, the voltage converter circuit including a voltage converter controller which generates a PWM signal to operate a power switch for voltage conversion. The voltage converter controller includes a sensing pin for sensing a current and the voltage converter controller receives a power supply. The parameter setting method includes: during a start-up stage, when the power supply increases above a predetermined reference level, the voltage converter controller outputting a current through the sensing pin; and setting at least one parameter of the voltage converter controller according to a voltage at the sensing pin.

In every cycle of a voltage converter circuit during the start-up stage or during normal operation, when the sensing pin thereof is not adopted for a feedback control, the parameter sampling and holding unit receives on the sensing pin a signal generated by applying a default current or a default voltage on resistor elements coupling to the sensing pin, and a parameter of the voltage converter controller is determined accordingly. Thus no extra pins are required for setting the parameter of the voltage converter controller and the hardware resource is saved.

These and other objectives of this invention will no doubt become obvious to those of ordinary skill in the art after reading the following detailed description of the preferred embodiments that is illustrated in the various figures and drawings.

DETAILED DESCRIPTION OF THE EMBODIMENTS

Figure 1:
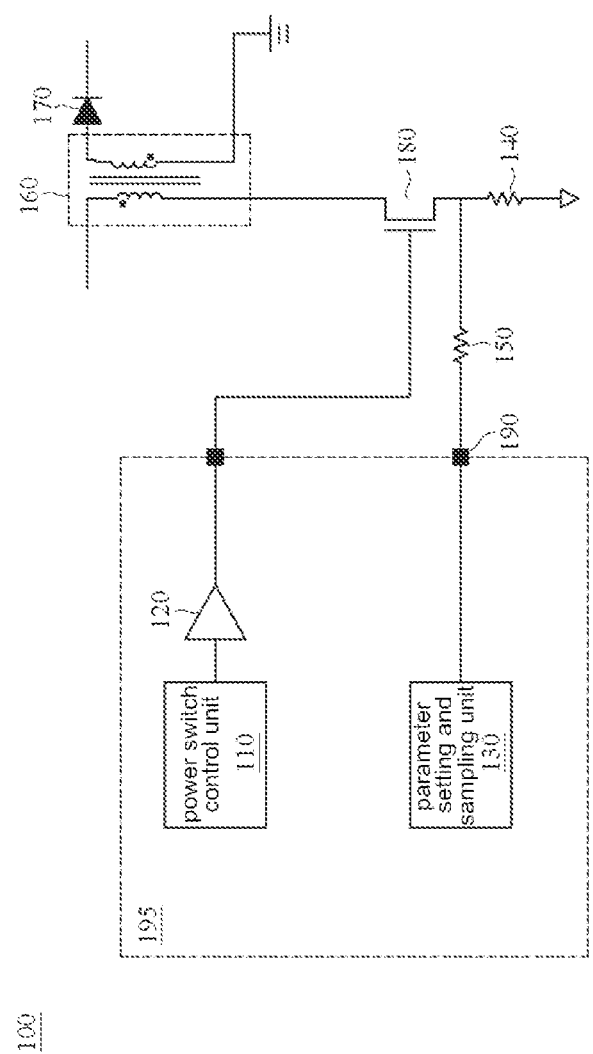
FIG. 1 is a schematic diagram of a voltage converter circuit of a first embodiment.

FIG. 1 is a schematic diagram of a voltage converter circuit 100 of a first embodiment. In FIG. 1, the major components instead of a completed schematic of a voltage converter circuit are shown which is sufficient to fully describe the innovation of the invention to those skilled in the art. The voltage converter circuit 100 is a fly-back switching power converter by which converts an input voltage source to a either higher or lower DC output voltage and drives a current load on an output terminal. The voltage converter circuit 100 includes a power switch control unit 110, a power switch driver unit 120, a parameter sampling and setting unit 130, a first resistor 140, a second resistor 150, a transformer 160, a diode 170, a power switch 180 and a sensing pin 190. The voltage converter circuit 100 includes a feedback loop (not shown) to determine a duty cycle of the conduction of a channel of the power switch 180. The power switch control unit 110 generates a control signal to the power switch driver unit 120 which accordingly generates a driving voltage signal or a driving current signal to drive the power switch 180 to control the conduction or cut-off of the channel of the power switch 180. Then a pulse-width-modulation (PWM) signal is generated on the secondary side of the transformer 160, that is, the side coupled with the diode 170. The PWM signal drives the current load through the diode 170.

In more detail, when the channel of the power switch 180 is conducted, no current is generated on the secondary side of the transformer 160, and the PWM signal on the secondary side is at a first level which corresponds to the voltage value of the input voltage source. And when the channel of the power switch 180 is turned off, a current is generated on the secondary side of the transformer 160, and the PWM signal on the secondary side is at a second level which corresponds to the voltage value of the DC output voltage. Since the channel of the power switch 180 conducts and turns off back and forth periodically, the PWM signal also toggles between the first level and the second level.

As shown in FIG. 1, the power switch control unit 110, the power switch driver unit 120 and the parameter sampling and setting unit 130 are disposed in a voltage converter controller 195 which can be but not limited to an integrated circuit implemented by a semiconductor process by which the geometric size and the cost of the voltage converter circuit 100 are reduced. The voltage converter controller 195 further includes a sensing pin 190 coupled to the second resistor 150 and an input terminal of the parameter sampling and setting unit 130. In the prior art, the sensing pin 190 is adopted to detect a first sensing signal relating to the feedback control. For example, when the channel of the power switch 180 is conducted, the sensing pin 190 is adopted to sense a sensing current flowing through the power switch 180, wherein the quantity of the sensing current corresponds to the current on the current load. When the channel of the power switch 180 is turned off, no meaningful signal is generated or detected on the sensing pin 190. The present invention adopts a default current or a default voltage applying on a resistor component to generate on the sensing pin 190 a signal which is then received by the parameter sampling and setting unit 130 to set a parameter of the voltage converter controller 195.

As shown in FIG. 1, when the channel of the power switch 180 is turned off, that is, when the PWM signal is at the second level, the parameter sampling and setting unit 130 generates on the sensing pin 190 a default current or a default voltage applying on the serial connection of the first resistor 140 and the second resistor 150 and generates a second sensing signal on the sensing pin 190. For example, the default current flows through the serial connection of the first resistor 140 and the second resistor 150 and generates the second sensing signal in a voltage type, or the default voltage biases on the serial connection of the first resistor 140 and the second resistor 150 and generates the second sensing signal in a current type. At the same time the parameter sampling and setting unit 130 samples the second sensing signal through the sensing pin 190 to generate a sampling signal. And when the channel of the power switch 180 is conducted, that is, the PWM signal is at the first level, the default current or default voltage is turned off, and the parameter sampling and setting unit 130 holds the sampling signal to set the parameter of the voltage converter controller 195. At the same time the sensing current on the channel of the power switch 180 flows through the first resistor 140 and generates a voltage as the first sensing signal. Then the sensing pin 190 couples to the first sensing signal through the second resistor 150, and the sensing signal is adopted by the voltage converter controller 195 for the feedback control.

Figure 2:
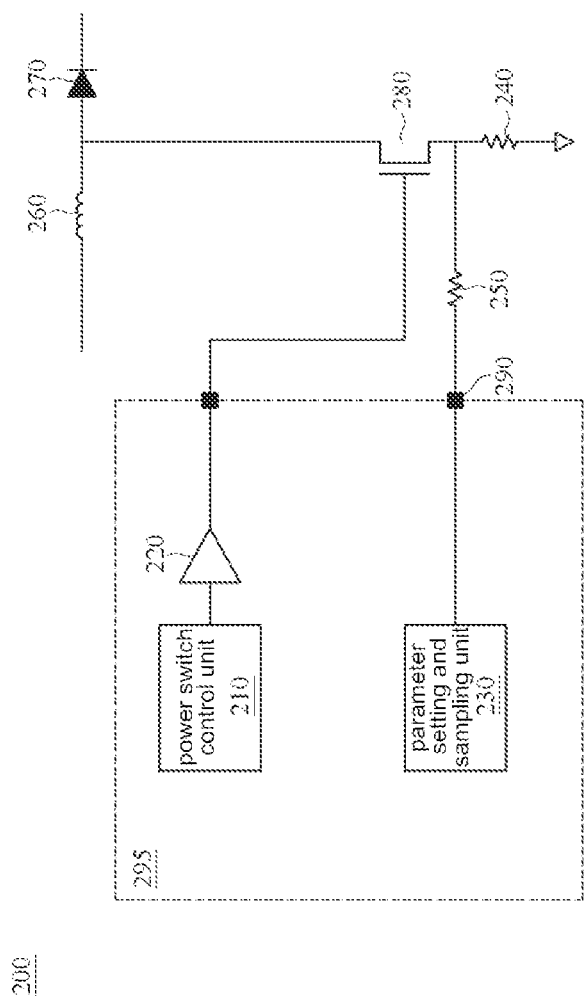
FIG. 2 is a schematic diagram of a voltage converter circuit of a second embodiment.

FIG. 2 is a schematic diagram of a voltage converter circuit 200 of a second embodiment. The voltage converter circuit 200 is a boost switching power converter by which converts an input voltage source to a higher DC output voltage and drives a current load on an output terminal. The voltage converter circuit 200 includes a power switch control unit 210, a power switch driver unit 220, a parameter sampling and setting unit 230, a first resistor 240, a second resistor 250, an inductor 260, a diode 270, a power switch 280 and a sensing pin 290. The power switch control unit 210, the power switch driver unit 220 and the parameter sampling and setting unit 230 are included in a voltage converter controller 295. The functions of the power switch control unit 210, the power switch driver unit 220 and the parameter sampling and setting unit 230 can be referred to the corresponding elements of the voltage converter controller 195 of the first embodiment. The voltage converter circuit 200 includes a feedback loop (not shown) to determine a duty cycle of the conduction of a channel of the power switch 280 and then a PWM signal is generated on the connecting node of the inductor 260 and the diode 270. The PWM signal drives the current load through the diode 270.

In the prior art, when the channel of the power switch 280 is turned off, no meaningful signal is generated or detected on the sensing pin 290. Nonetheless in every period of the PWM signal when the channel of the power switch 280 is turned off, the second embodiment of the present invention adopts a default current or a default voltage applying on a resistor component to generate on the sensing pin 290 a signal which is then received by the parameter sampling and setting unit 230 to set a parameter of the voltage converter controller 295.

As shown in FIG. 2, when the channel of the power switch 280 is turned off, the parameter sampling and setting unit 230 generates on the sensing pin 290 a default current or a default voltage applying on the serial connection of the first resistor 240 and the second resistor 250 and generates a second sensing signal on the sensing pin 290. For example, the default current flows through the serial connection of the first resistor 240 and the second resistor 250 and generates the second sensing signal in a voltage type, or the default voltage biases on the serial connection of the first resistor 240 and the second resistor 250 and generates the second sensing signal in a current type. At the same time the parameter sampling and setting unit 230 samples the second sensing signal through the sensing pin 290 to generate a sampling signal. And when the channel of the power switch 280 is conducted, the default current or default voltage is turned off, and the parameter sampling and setting unit 230 holds the sampling signal to set the parameter of the voltage converter controller 295. At the same time the sensing current on the channel of the power switch 280 flows through the first resistor 240 and generates a voltage as the first sensing signal. Then the sensing pin 290 couples to the first sensing signal through the second resistor 250, and the sensing signal is adopted by the voltage converter controller 295 for the feedback control.

Figure 3:
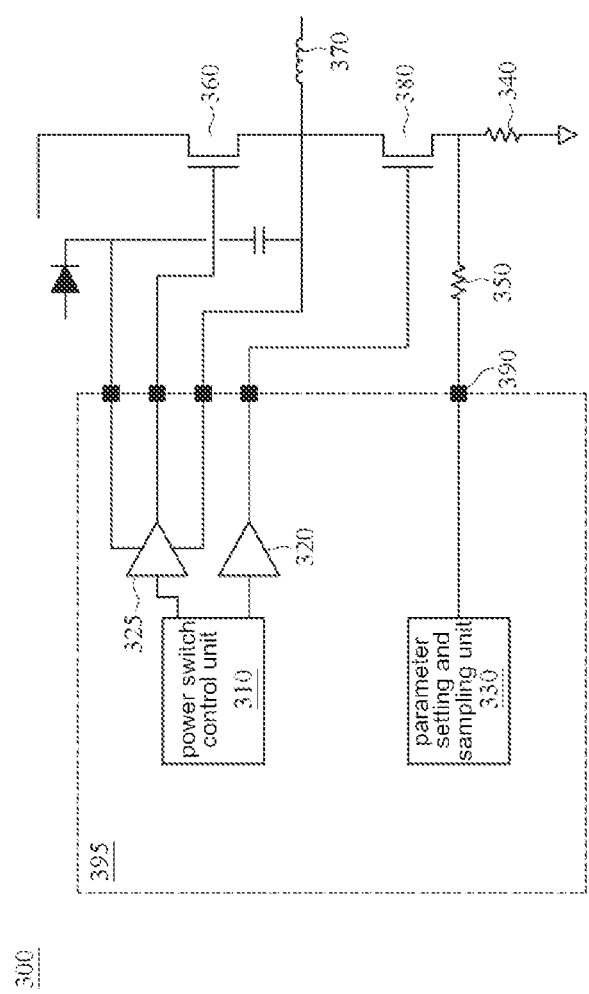
FIG. 3 is a schematic diagram of a voltage converter circuit of a third embodiment.

FIG. 3 is a schematic diagram of a voltage converter circuit 300 of a third embodiment. The voltage converter circuit 300 is a Buck switching power converter by which converts an input voltage source to a lower DC output voltage and drives a current load on an output terminal. The voltage converter circuit 300 includes a power switch control unit 310, a power switch driver unit 320, a power switch driver unit 325, a parameter sampling and setting unit 330, a first resistor 340, a second resistor 350, an inductor 370, a power switch 360, a power switch 380 and a sensing pin 390. The power switch control unit 310, the power switch driver unit 320, the power switch driver unit 325 and the parameter sampling and setting unit 330 are included in a voltage converter controller 395. The functions of the power switch control unit 310, the power switch driver units 320 and 325 and the parameter sampling and setting unit 330 can be referred to the corresponding elements of the voltage converter controller 195 of the first embodiment. The voltage converter circuit 300 includes a feedback loop (not shown) to determine a duty cycle of the conduction of a channel of the power switches 380 and 380 and then a PWM signal is generated on the connecting node of the power switches 360 and 380. The PWM signal drives the current load through the inductor 370.

In the prior art, when the channel of the power switch 380 is turned off, no meaningful signal is generated or detected on the sensing pin 390. Nonetheless in every period of the PWM signal when the channel of the power switch 380 is turned off, the third embodiment of the present invention adopts a default current or a default voltage applying on a resistor component to generate on the sensing pin 390 a signal which is then received by the parameter sampling and setting unit 330 to set a parameter of the voltage converter controller 395.

As shown in FIG. 3, when the channel of the power switch 380 is turned off, the parameter sampling and setting unit 330 generates on the sensing pin 390 a default current or a default voltage applying on the serial connection of the first resistor 340 and the second resistor 350 and generates a second sensing signal on the sensing pin 390. For example, the default current flows through the serial connection of the first resistor 340 and the second resistor 350 and generates the second sensing signal in a voltage type, or the default voltage biases on the serial connection of the first resistor 340 and the second resistor 350 and generates the second sensing signal in a current type. At the same time the parameter sampling and setting unit 330 samples the second sensing signal through the sensing pin 390 to generate a sampling signal. And when the channel of the power switch 380 is conducted, the default current or default voltage is turned off, and the parameter sampling and setting unit 330 holds the sampling signal to set the parameter of the voltage converter controller 395. At the same time the sensing current on the channel of the power switch 380 flows through the first resistor 340 and generates a voltage as the first sensing signal. Then the sensing pin 390 couples to the first sensing signal through the second resistor 350, and the sensing signal is adopted by the voltage converter controller 395 for the feedback control.

In the aforementioned three embodiments, the quantity of the second sensing signal of the voltage converter controller 195/295/395 is determined by the default current, the default voltage, the resistance of the first resistor 140/240/340 and the second resistor 150/250/350. For example the value of the default current or the default voltage can be fixed in the design, and the parameter of the voltage converter controller 195/295/395 determined by the second sensing signal can be adjusted by changing the resistance of the first resistor 140/240/340 or the second resistor 150/250/350. The parameter can be for example an output driving current of the power switch driver unit 120/220/320/325, or a current threshold of an over-current protection unit (not shown) in the voltage converter controller 195/295/395 wherein when the current on the current load exceeds the current threshold, the voltage converter controller 195/295/395 turns off the channel of the power switch 180/280/360/380.

Figure 8:
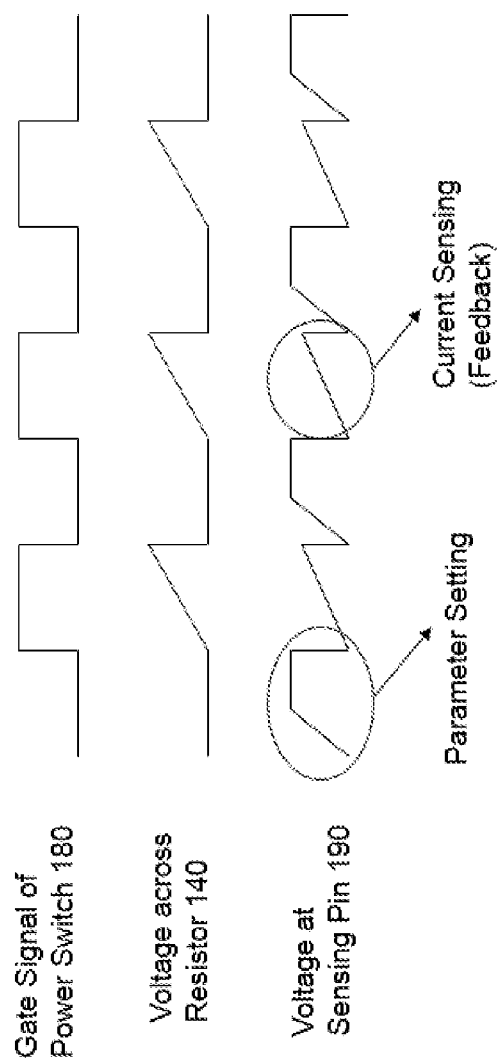
FIG. 8 is a waveform diagram showing parameter setting during normal operation wherein the embodiment of FIG. 1 is taken as an example.

In one embodiment, the sampling and holding process on the second sensing signal by the parameter sampling and setting unit 130/230/330 is performed in every period of the PWM signal. Thus, the parameter is periodically updated, so the leakage problem does not produce any significant influence. As a result, the sensing signal can be processed in its analog form without being converted to a digital signal. That is, since it is not necessary to convert the sensing signal into a digital form, an analog-to-digital converter which is relatively large in size, and a memory circuit can be omitted, and the corresponding area and power consumption are saved. Referring to FIG. 8, taking the embodiment of FIG. 1 as an example, the current sensing and feedback function can be performed during the conduction period of the power switch 180 (when the gate signal of the power switch 180 is at the first level), and the parameter setting function can be performed during the non-conduction period of the power switch 180 (when the gate signal of the power switch 180 is at the second level).

Figure 9:
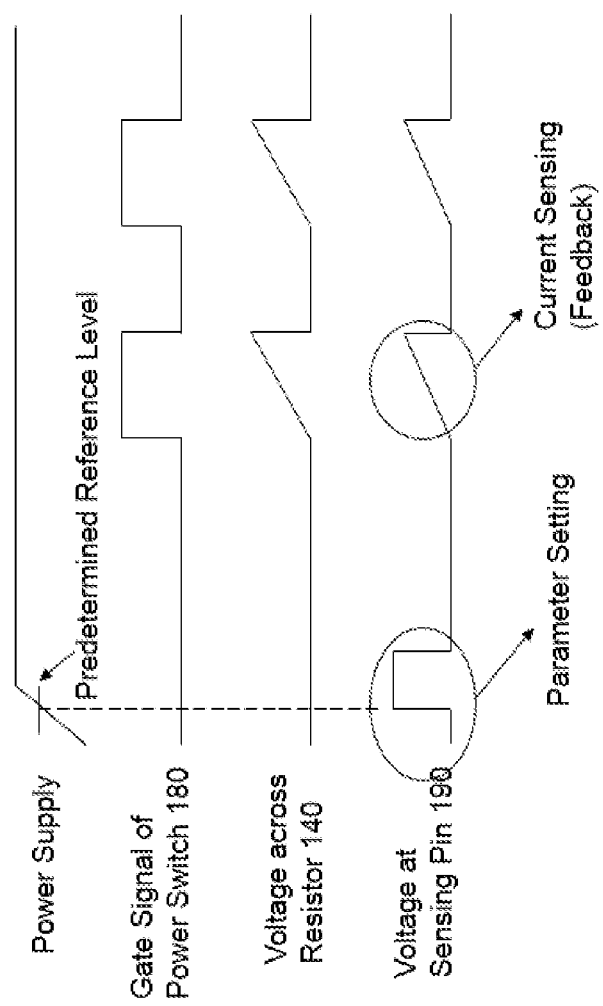
FIG. 9 is a waveform diagram showing parameter setting during the start-up stage wherein the embodiment of FIG. 1 is taken as an example.

In another embodiment, the parameter sampling and setting unit 130/230/330 performs the parameter setting function during a start-up stage before the voltage converter circuit enters normal operation. If necessary, the parameter setting can be stored by any means, for example converted to and stored in a digital form; however, it is not always necessary to store the parameter setting, and in many occasions the parameter only needs to be set once, without storage. Referring to FIG. 9, taking the embodiment of FIG. 1 as an example, the parameter setting function can be performed when the power supply received by the voltage converter controller 195 is higher than a predetermined reference level. To set the parameter, in one embodiment, the parameter sampling and setting unit 130 outputs a current through the sensing pin 190, which flows through the second resistor 150 and the first resistor 140 to ground. The parameter sampling and setting unit 130 senses a voltage at the sensing pin 190. Thus, for example, the parameter can be set by the resistance of the second resistor 150.

Furthermore, because the voltage converter controller 195/295/395 is an integrated circuit which is required to provide pins for electrical connection to another circuit, it is preferred that the number of pins is as smallest as possible, considering the geometric size and cost. The sensing pin 190/290/390 of the voltage converter controller 195/295/395 of the present invention achieves this purpose. Because the sensing pin is a multi-functional pin, the parameter setting function can be achieved without increasing the number of the pins. A parameter of the voltage converter controller can be set by an external component with great flexibility, without affecting the normal operation of the circuit. The present invention can be applied to various types of switching power converters, having a broad application range.

It is noted that the voltage converter controllers 195, 295 and 395 in the aforementioned embodiments are described herein for illustration purpose but not to limit the scope of the present invention. For example the voltage converter controller 195, 295 and 395 can be integrated circuits implemented by a semiconductor process, or effective circuits made by other arts. The voltage converter controller 195, 295 and 395 can also further include power switches or other components. People skilled in the art may implement the voltage converter controller of the present invention based on the requirements of the applications, the consideration of cost on design and the state-of-the-art knowledge in the art.

Figure 4:
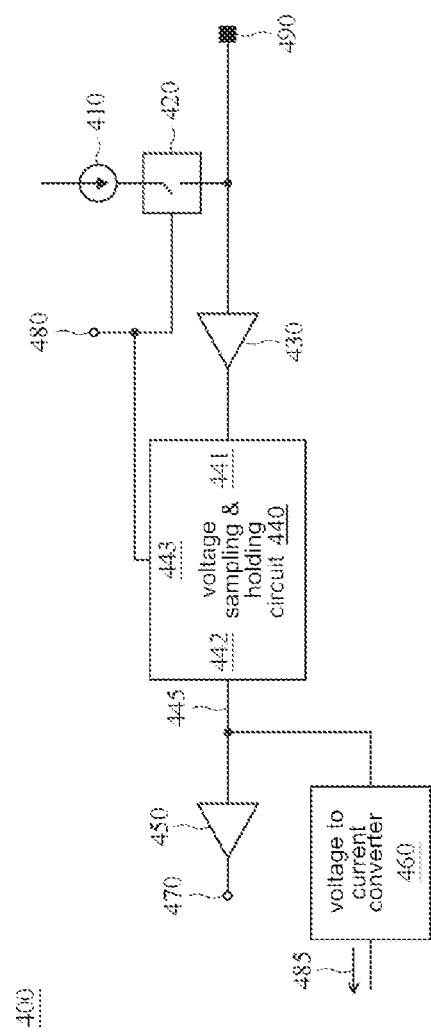
FIG. 4 is a schematic diagram of an embodiment of a parameter sampling and setting unit.

FIG. 4 is a schematic diagram of an embodiment of a parameter sampling and setting unit 400. The parameter sampling and setting unit 400 can be adopted as the parameter sampling and setting unit 130/230/330 of the voltage converter controller 195/295/395. Parameter sampling and setting unit 400 includes a setting current source 410, a setting switch 420, an input buffer stage 430, a voltage sampling and holding circuit 440, a parameter input terminal 490, a first parameter output terminal 445 and a control terminal 480.

As shown in FIG. 4, the parameter input terminal 490 is an input terminal of the parameter sampling and setting unit 400 and couples to the sensing pin 190/290/390 of the voltage converter controller 195/295/395. The setting current source 410 is adopted to generate a default current. A channel of the setting switch 420 couples between the setting current source 410 and the parameter input terminal 490. A control terminal of the setting switch 420 couples to the control terminal 480. The signal on the control terminal 480 corresponds to the control signal of the power switch control unit 110/210/310 of the voltage converter controller 195/295/395. When the aforementioned PWM signal is at the first level, the channel of the setting switch 420 is turned off. And when the PWM signal is at the second level, the channel of the setting switch 420 is conducted, and the default current of the setting current source 410 flows into the parameter input terminal 490, that is, the sensing pin 190/290/390, and also into the first resistor 140/240/340 and the second resistor 150/250/350 to generate the second sensing signal. The circuit design related to the function and the operation in this paragraph should be common knowledge to whom skilled in the art, and will not be described further herein.

As shown in FIG. 4, the input buffer stage 430 responds a voltage signal on the parameter input terminal 490 to the voltage sampling and holding circuit 440. A gain value can be designed in the input buffer stage 430 to derive a better signal quality for the input of the voltage sampling and holding circuit 440. Note that the input buffer stage 430 is not a must to the parameter sampling and setting unit 400. The description herein is for the illustration of a best practice. The one who skilled in the art can choose to or not to implement the input buffer stage 430 in the parameter sampling and setting unit 400 based on the tradeoff between hardware cost and signal quality. Correspondingly, the input terminal of the voltage sampling and holding circuit 440 may connect directly to the parameter input terminal 490.

As shown in FIG. 4, the voltage sampling and holding circuit 440 includes an input terminal 441, an output terminal 442 and a control terminal 443. The input terminal 441 couples to the output terminal of the input buffer stage 430. The output terminal 442 couples to the first parameter output terminal 445. The control terminal 443 couples to the control terminal 480. When the pulse-width-modulation is at the second level, the voltage sampling and holding circuit 440 is adopted to sample the signal on the parameter input terminal 490 as the second sensing signal and generates a sampling signal. And when the pulse-width-modulation is at the first level, the voltage sampling and holding circuit 440 is adopted to set the parameter of the voltage converter controller 195/295/395, for example to set a current threshold of an over-current protection unit. In case that when the current of the current load is detected to be larger than the current threshold, the voltage converter controller 195/295/395 turns off the channel of the power switch 180/280/360/380.

Besides, the parameter sampling and setting unit 400 can further include an output buffer stage 450 and a voltage to current converter 460. The output buffer stage 450 has an output terminal and an input terminal. The input terminal of the output buffer stage 450 couples to the first parameter output terminal 445. The output buffer stage 450 generates a parameter-setting voltage signal 470 on the output terminal thereof according to a signal on the input terminal thereof to determine a parameter of the voltage converter circuit 195/295/395, for example a current threshold of an over-current protection unit. A voltage gain can be designed for the output buffer stage 450 to properly adjust the parameter-setting voltage signal 470. The voltage to current converter 460 has an input terminal and an output terminal. The input terminal of the voltage to current converter 460 couples to the first parameter output terminal 445. The voltage to current converter 460 generates a parameter-setting current signal 485 on the output terminal thereof according to a signal on the input terminal thereof to determine a parameter of the voltage converter controller 195/295/395, for example a output driving current of the power switch driver unit 120/220/320/3235.

Figure 5:
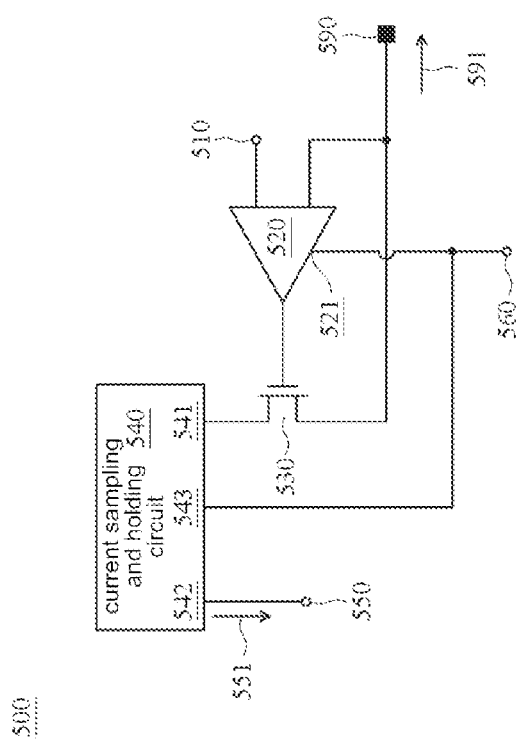
FIG. 5 is a schematic diagram of another embodiment of a parameter sampling and setting unit.

FIG. 5 is a schematic diagram of another embodiment of a parameter sampling and setting unit 500. The parameter sampling and setting unit 500 can be adopted as the parameter sampling and setting unit 130/230/330 of the voltage converter controller 195/295/395. Parameter sampling and setting unit 500 includes a setting voltage source 510, a voltage loop amplifier 520, a voltage loop transistor 530, a current sampling and holding circuit 540, a parameter input terminal 590, a parameter output terminal 550 and a control terminal 560.

As shown in FIG. 5, the parameter input terminal 590 is an input terminal of the parameter sampling and setting unit 500 and couples to the sensing pin 190/290/390 of the voltage converter controller 195/295/395. The setting voltage source 510 is adopted to generate a default voltage. The voltage loop amplifier 520 has a pair of input terminals, an output terminal and a enabling terminal 521, wherein the pair of input terminals thereof couples to the setting voltage source 510 and the parameter input terminal 590 respectively, and the enabling terminal 521 couples to the control terminal 560. The signal on the control terminal 560 corresponds to the control signal of the power switch control unit 110/210/310 of the voltage converter controller 195/295/395. When the aforementioned PWM signal is at the first level, the voltage loop amplifier 520 is turned off. And when the PWM signal is at the second level, the voltage loop amplifier 520 is turned on. The voltage loop transistor 530 is a transistor element with a control terminal and a channel with two terminals, wherein one terminal of the channel of the voltage loop transistor 530 couples to the parameter input terminal 590, and the control terminal of the voltage loop transistor 530 couples to the output terminal of the voltage loop amplifier 520. When the voltage loop amplifier 520 is turned on, a negative feedback loop is formed with the voltage loop transistor 530 and the virtual short-circuited feature of the input terminals of an amplifier renders the voltage of the parameter input terminal 590, that is, the voltage of the sensing pin 190/290/390 essentially equals to the default voltage generated by the setting voltage source 510. Then a second sensing signal 591 in current type is generated by biasing the first resistor 140/240/340 and the second resistor 150/250/350 with the default voltage.

As shown in FIG. 5, a current sampling and holding circuit 540 has an input terminal 541, an output terminal 542 and a control terminal 543. The input terminal 541 couples to the other terminal of the channel of the voltage loop transistor 530. The output terminal 543 couples to the parameter output terminal 550. The control terminal 543 couples to the control terminal 560. When the PWM signal is at the second level, the current sampling and holding circuit 540 samples the second sensing signal 591 and generates the sampling signal. And when the PWM signal is at the first level, the current sampling and holding circuit 540 holds the sampling signal on the output terminal 542. The output current signal 551 on the parameter output terminal 550 can be adopted to determine a parameter of the voltage converter controller 195/295/395, for example a output driving current of the power switch driver unit 120/220/320/3235.

Figure 6:
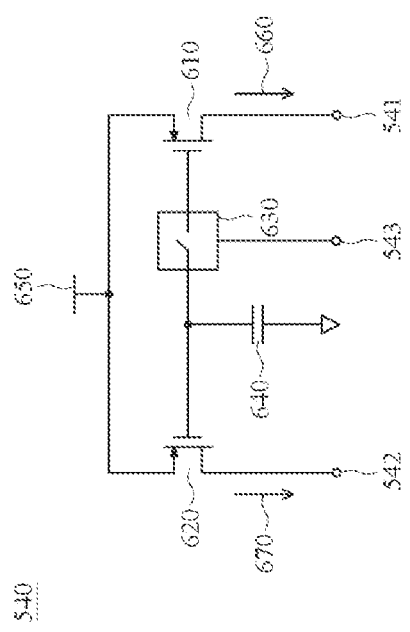
FIG. 6 is a schematic diagram of an embodiment of a current sampling and holding circuit.

FIG. 6 is a schematic diagram of an embodiment of a current sampling and holding circuit 540. The current sampling and holding circuit 540 further includes a current input transistor 610, a current output transistor 620, a current sampling switch 630, a current sampling capacitor 640, and a supply voltage source 650.

As shown in FIG. 6, a channel of the current input transistor 610 couples between the supply voltage source 650 and the input terminal 541. A control terminal of the current input transistor 610 couples to one terminal of the channel of the current sampling switch 630. A channel of the current output transistor 620 couples between the supply voltage source 650 and the output terminal 542. A control terminal of the current output transistor 620 couples to the other terminal of the current sampling switch 630 and the current sampling capacitor 640. A control terminal of the current sampling switch 630 couples to the control terminal 543. When the signal on the control terminal 543 renders the channel of the current sampling switch 630 conducting, the current input transistor 610 and the current output transistor 620 forms a current mirror and an output current 670 on the current output transistor 620 corresponds to an input current 660 on the current input transistor 610. That is, the current sampling and holding circuit 540 is sampling the second sensing signal 591 and generating the output current 670 as a sampling signal. Note that an amplifying factor of the output current 670 to the input current 660 relates to the geometric size of the current input transistor 610 and the current output transistor 620. And when the signal on the control terminal 543 is changed and renders the channel of the current sampling switch 630 turning off, the voltage signal on the control terminal of the current output transistor 620 is hold by the current sampling capacitor 640, and the output current 670 is also hold. Thus the current sampling and holding circuit 540 holds the sampling signal until the state of the current sampling switch 630 is changed in the next cycle of the PWM signal. Note that a voltage variation of the current sampling capacitor 640 incurred by a leakage current thereon is relatively small and can be ignored in this design.

Figure 7:
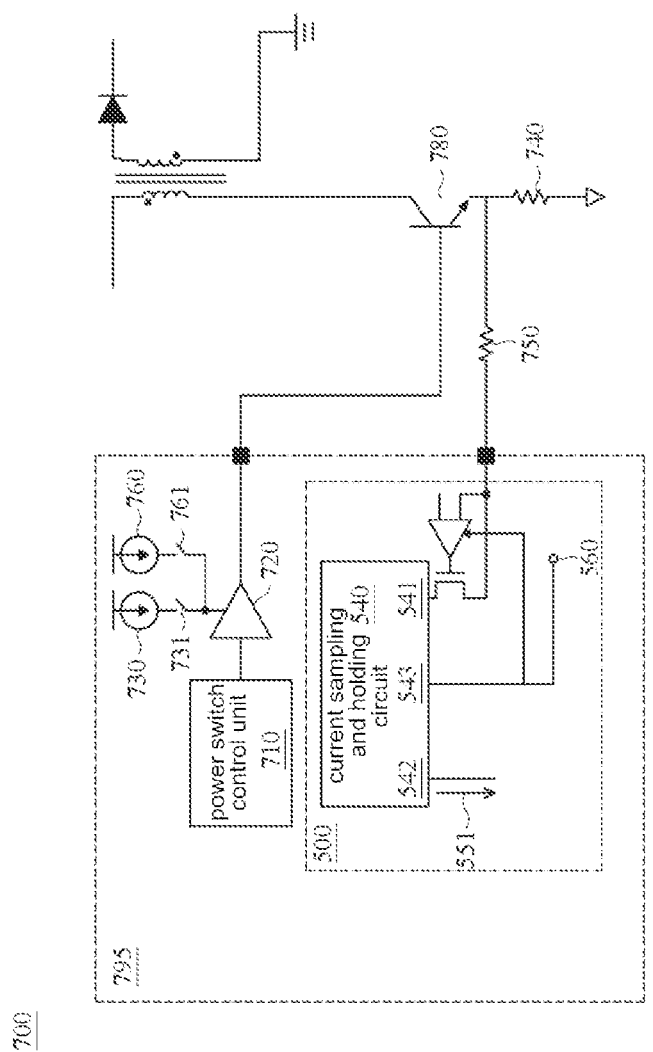
FIG. 7 is a schematic diagram of an embodiment of a parameter sampling and setting unit adopted in a power converter controller of a fly-back switching power converter.

FIG. 7 is a schematic diagram of an embodiment of a parameter sampling and setting unit 500 adopted in a power converter controller 795 of a fly-back switching power converter 700. The functions of the fly-back switching power converter 700 can be referred to the related descriptions of the voltage converter circuit 100. Nonetheless, a power switch 780 of the fly-back switching power converter 700 is a bipolar junction transistor, i.e., BJT in short. Thus it is necessary for the power switch driver unit 720 to output a driving current to conduct a channel of the power switch 780. However there is a tradeoff on the design that if the driving current is too large there will be unnecessary waste on the power consumption, and if the driving current is too small there will be sacrifices on the operating speed and also the converting efficiency of the fly-back switching power converter 700. The power converter controller 795 thus adopts the parameter sampling and setting unit 500 of the present invention. By adjusting resistances of a first resistor 740 and a second resistor 750, the output current signal 551 is changed, and an output driving setting current 730 and also the output driving current of the power switch driver unit 720 are determined. As a result the setting of the power switch driver unit 720 can be optimized thereby according to various types of the power switch 780 in different applications with different requirements on power consumption, operating speed and converting efficiency.

Besides, the power converter controller 795 can further include an output driving default current 760, a switch 731 and a switch 761. A channel of the switch 731 couples between the output driving setting current 730 and the power switch driver unit 720. A channel of the switch 761 couples between the output driving setting current 760 and the power switch driver unit 720. The current of the output driving setting current 760 is a fixed value. By conducting or turning off the switch 731 and the switch 761, the output driving current can be determined by optional combinations of the driving setting current 730 and the driving setting current 760.

It is to be noted that the aforementioned embodiments are described herein for the illustration purpose but not to limit the scope of the present invention. People skilled in the art can implement the present invention according to the practical requirements on applications, cost considerations on design, and with improved components and elements introduced by the state-of-the-art technique.

This invention is advantageous because in every cycle of a voltage converter circuit during a start-up stage or during normal operation, when a sensing pin thereof is not adopted for a feedback control, a parameter sampling and holding unit receives on the sensing pin a signal generated by applying a default current or a default voltage on resistor elements coupling to the sensing pin, and a parameter of the voltage converter controller is determined accordingly. Thus no extra pins are required for setting the parameter of the voltage converter controller and the hardware resource is saved. The present invention is different from and advantageous over the prior art U.S. Pat. No. 7,315,190. In U.S. Pat. No. 7,315,190, the parameter setting is achieved by a control pin for controlling the power switch, whereas in the present invention, the parameter setting is achieved by a sensing pin. In addition to this difference, U.S. Pat. No. 7,315,190 can only set the parameters during a start-up stage, but the present invention can set the parameters either during a start-up stage or during normal operation, or both. Hence, the present invention provides a broader application than U.S. Pat. No. 7,315,190.

The aforementioned descriptions represent merely the preferred embodiment of this invention, without any intention to limit the scope of this invention thereto. Various equivalent changes, alterations, or modifications based on the claims of this invention are all consequently viewed as being embraced by the scope of this invention.

What is claimed is:

1. A parameter setting method for a voltage converter circuit, the voltage converter circuit including a voltage converter controller which generates a PWM signal to operate a power switch for voltage conversion, the voltage converter controller including a sensing pin for sensing a current and the voltage converter controller receiving a power supply, the parameter setting method comprising:
   during a start-up stage, when the power supply increases above a predetermined reference level, the voltage converter controller generating a current by a current source circuit inside the voltage converter controller and outputting the current from the sensing pin to outside the voltage converter controller; and
   setting at least one parameter of the voltage converter controller according to a voltage at the sensing pin.

2. The parameter setting method of claim 1, wherein the voltage converter circuit is a fly-back switching power converter, a boost switching power converter or a buck switching power converter.

3. The parameter setting method of claim 1, wherein the voltage converter circuit is a fly-back switching power converter, and the power switch is for controlling a current flowing through a primary side of transformer of the fly-back switching power converter so that an induced current is generated at a secondary side of the transformer, and wherein the sensing pin is for sensing the current flowing through the primary side.

4. A voltage converter controller, adapted to a voltage converter circuit which operates a power switch of the voltage converter circuit to generate a pulse-width-modulation signal and to drive a current load with the pulse-width-modulation signal toggling between a first level and a second level, the voltage converter controller comprising:
   a sensing pin, receiving a first sensing signal when the pulse-width-modulation signal is at the first level, and receiving a second sensing signal when the pulse-width-modulation signal is at the second level; and
   a parameter sampling and setting unit, having an input terminal coupling to the sensing pin; when the pulse-width-modulation signal is at the second level, the parameter sampling and setting unit generates a default current by a setting current source inside the parameter sampling and setting unit and outputs the default current from the sensing pin to outside the voltage converter controller to generate the second sensing signal or generates a default voltage according to a setting voltage source inside the voltage converter controller and outputting the default voltage on the sensing pin to generate the second sensing signal, and simultaneously samples the second sensing signal to generate a sampling signal; and when the pulse-width-modulation signal is at the first level, the parameter sampling and setting unit holds the sampling signal to set a parameter of the voltage converter controller.

5. The voltage converter controller of claim 4, wherein the voltage converter circuit further comprises a first resistor, the first sensing signal is a voltage signal determined by a sensing current flowing through the first resistor, and the sensing current corresponds to a current quantity of the current load.

6. The voltage converter controller of claim 4, wherein the voltage converter circuit further comprises a first resistor and a second resistor, the second sensing signal is a voltage signal determined by the default current flowing through the serial connection of the first resistor and the second resistor, and the default current is fixed during operation.

7. The voltage converter controller of claim 4, wherein the voltage converter circuit further comprises a first resistor and a second resistor, the second sensing signal is a current signal determined by applying the default voltage across the serial connection of the first resistor and the second resistor, and the default voltage is fixed during operation.

8. The voltage converter controller of claim 4, further comprising a power switch driver unit for driving the power switch, wherein an output driving current of the power switch driver unit is determined by the second sensing signal.

9. The voltage converter controller of claim 4, further comprising an over-current protection unit having an over-current threshold determined by the second sensing signal, when a current of the current load is larger than the over-current threshold, the voltage converter controller turns off a channel of the power switch.

10. The voltage converter controller of claim 4, wherein the parameter sampling and setting unit comprises:
    the input terminal;
    the setting current source, for generating the default current;
    a setting switch, having a channel coupling between the setting current source and the sensing pin, when the pulse-width-modulation signal is at the first level, the channel of the setting switch is turned off, and when the pulse-width-modulation signal is at the second level, the channel of the setting switch is conducted; and
    a voltage sampling and holding circuit, having an input terminal and an output terminal, the input terminal of the voltage sampling and holding circuit coupling to the sensing pin, when the pulse-width-modulation signal is at the second level, the voltage sampling and holding circuit samples the second sensing signal and generates the sampling signal, and when the pulse-width-modulation signal is at the first level, the voltage sampling and holding circuit outputs and holds the sampling signal on the output terminal thereof.

11. The voltage converter controller of claim 10, wherein the parameter sampling and setting unit further comprises:
    an output buffer stage, having an input terminal and an output terminal, the input terminal of the output buffer stage coupling to the output terminal of the voltage sampling and holding circuit, the output buffer stage generating a parameter-setting voltage signal on the output terminal thereof according to a signal on the input terminal thereof to determine a parameter of the voltage converter controller; and a voltage to current converter, having an input terminal and an output terminal, the input terminal of the voltage to current converter coupling to the output terminal of the voltage sampling and holding circuit, the voltage to current converter generating a parameter-setting current signal on the output terminal thereof according to a signal on the input terminal thereof to determine a parameter of the voltage converter controller.

12. The voltage converter controller of claim 4, wherein the parameter sampling and setting unit comprises:

the input terminal;

the setting voltage source, generating the default voltage;

a voltage loop amplifier, having a pair of input terminals and a output terminal, the pair of input terminals thereof coupling to the setting voltage source and the sensing pin respectively;

a voltage loop transistor, having a control terminal and a channel with two terminals, one terminal of the channel of the voltage loop transistor coupling to the sensing pin, and the control terminal of the voltage loop transistor coupling to the output terminal of the voltage loop amplifier; and a current sampling and holding circuit, having an input terminal and an output terminal, the input terminal of the current sampling and holding circuit coupling to the other terminal of the channel of the voltage loop transistor, when the pulse-width-modulation signal is at the second level, the current sampling and holding circuit samples the second sensing signal and generates the sampling signal, and when the pulse-width-modulation signal is at the first level, the current sampling and holding circuit holds the sampling signal on the output terminal thereof.

13. A voltage converter circuit, comprising:

a power switch, for generating a pulse-width-modulation signal and driving a current load, wherein the pulse-width-modulation signal toggles between a first level and a second level;

a sensing pin, receiving a first sensing signal when the pulse-width-modulation signal is at the first level, and receiving a second sensing signal when the pulse-width-modulation signal is at the second level; and a parameter sampling and setting unit, having an input terminal coupling to the sensing pin, when the pulse-width-modulation signal is at the second level, the parameter sampling and setting unit generates a default current by a setting current source inside the parameter sampling and setting unit and outputs the default current from the sensing pin to outside the voltage converter controller to generate the second sensing signal or generates a default voltage according to a setting voltage source inside the voltage converter controller and outputting the default voltage on the sensing pin to generate the second sensing signal, and simultaneously samples the second sensing signal to generate a sampling signal; and when the pulse-width-modulation signal is at the first level, the parameter sampling and setting unit holds the sampling signal to set a parameter of the voltage converter circuit.

14. The voltage converter circuit of claim 13, wherein the voltage converter circuit further comprises a first resistor, the first sensing signal is a voltage signal determined by a sensing current flowing through the first resistor, and the sensing current corresponds to a current quantity of the current load.

15. The voltage converter circuit of claim 14, wherein the parameter sampling and setting unit comprises:

the input terminal;

the setting voltage source, generating the default voltage;

a voltage loop amplifier, having a pair of input terminals and an output terminal, the pair of input terminals thereof coupling to the setting voltage source and the sensing pin respectively;

a voltage loop transistor, having a control terminal and a channel with two terminals, one terminal of the channel of the voltage loop transistor coupling to the sensing pin, and the control terminal of the voltage loop transistor coupling to the output terminal of the voltage loop amplifier; and a current sampling and holding circuit, having an input terminal and an output terminal, the input terminal of the current sampling and holding circuit coupling to the other terminal of the channel of the voltage loop transistor, when the pulse-width-modulation signal is at the second level, the current sampling and holding circuit samples the second sensing signal and generates the sampling signal, and when the pulse-width-modulation signal is at the first level, the current sampling and holding circuit holds the sampling signal on the output terminal thereof.

16. The voltage converter circuit of claim 13, wherein the voltage converter circuit further comprises a first resistor and a second resistor, the second sensing signal is a voltage signal determined by the default current flowing through the serial connection of the first resistor and the second resistor, and the default current is fixed during operation.

17. The voltage converter circuit of claim 13, wherein the voltage converter circuit further comprises a first resistor and a second resistor, the second sensing signal is a current signal determined by applying the default voltage across the serial connection of the first resistor and the second resistor, and the default voltage is fixed during operation.

18. The voltage converter circuit of claim 13, further comprising a power switch driver unit to drive the power switch, wherein an output driving current of the power switch driver unit is determined by the second sensing signal.

19. The voltage converter circuit of claim 13, further comprising an over-current protection unit having an over-current threshold determined by the second sensing signal, when a current of the current load is larger than the over-current threshold, the voltage converter circuit turns off a channel of the power switch.

20. The voltage converter circuit of claim 13, wherein the parameter sampling and setting unit comprises:

the input terminal;

the setting current source, generating the default current;

a setting switch, having a channel coupling between the setting current source and the sensing pin, when the pulse-width-modulation signal is at the first level, the channel of the setting switch is turned off, and when the pulse-width-modulation signal is at the second level, the channel of the setting switch is conducted; and a voltage sampling and holding circuit, having an input terminal and an output terminal, the input terminal of the voltage sampling and holding circuit coupling to the sensing pin, when the pulse-width-modulation signal is at the second level, the voltage sampling and holding circuit samples the second sensing signal and generates the sampling signal, and when the pulse-width-modulation signal is at the first level, the voltage sampling and holding circuit outputs and holds the sampling signal on the output terminal thereof.

21. The voltage converter circuit of claim 20, wherein the parameter sampling and setting unit further comprises:
an output buffer stage, having an input terminal and an output terminal, the input terminal of the output buffer stage coupling to the output terminal of the voltage sampling and holding circuit, the output buffer stage generating a parameter-setting voltage signal on the output terminal thereof according to a signal on the input terminal thereof to determine a parameter of the voltage converter circuit; and
a voltage to current converter, having an input terminal and an output terminal, the input terminal of the voltage to current converter coupling to the output terminal of the voltage sampling and holding circuit, the voltage to current converter generating a parameter-setting current signal on the output terminal thereof according to a signal on the input terminal thereof to determine a parameter of the voltage converter circuit.

* * * * *